United States Patent
Miller

[11] Patent Number: 6,118,595
[45] Date of Patent: Sep. 12, 2000

[54] MOUNTED IMMERSIVE VIEW

[76] Inventor: James E. Miller, 231 Spencer St., Naugatuck, Conn. 06770

[21] Appl. No.: 09/256,067

[22] Filed: Feb. 24, 1999

[51] Int. Cl.[7] ................................................ G02B 13/06
[52] U.S. Cl. ...................... 359/725; 359/728; 382/285; 348/36
[58] Field of Search .................................. 359/725, 728; 382/285; 348/36; 434/40; 345/425

[56] References Cited

U.S. PATENT DOCUMENTS

| | | | |
|---|---|---|---|
| 4,241,985 | 12/1980 | Globus et al. | 354/99 |
| 4,350,489 | 9/1982 | Gdovin | 434/40 |
| 5,642,293 | 6/1997 | Manthey et al. | 364/508 |
| 5,721,585 | 2/1998 | Keast et al. | 348/36 |
| 5,796,426 | 8/1998 | Gullichsen et al. | 348/207 |
| 5,963,213 | 10/1999 | Guedalia et al. | 345/425 |

*Primary Examiner*—Georgia Epps
*Assistant Examiner*—Tim Thompson
*Attorney, Agent, or Firm*—Ware Fressola Van Der Sluys & Adolphson

[57] ABSTRACT

A method for providing as a surface of a closed-surface object, such as a sphere, and the resulting construction itself, portions of photographs from a set of photographs, the portions of photographs in combination providing a full, spherical view, called an immersed view, as seen from the location of a camera used to take the photographs, the camera having been aimed in each of a set of different directions to take the set of photographs. The different directions in which the camera is aimed are based on the field of view of the camera, which in the preferred embodiment is held fixed while taking the entire set of photographs. The immersive view includes substantially all four-pi radians of the view from the location of the camera, including views in directions both vertically directly up (in the direction of the zenith) and vertically directly down (in the direction of the nadir).

8 Claims, 6 Drawing Sheets

MOUNTED IMMERSIVE VIEW

BACKGROUND OF THE INVENTION

1. Technical Field

The present invention pertains to the field of panoramic photography. More particularly, the present invention pertains to providing, on either the inner surface of a hollow object or the outer surface of an object, a view in photographs arranged on the surface of the object of what would be seen looking from some viewing position in all directions.

2. Description of Related Art

Panoramic photography, to encompass a wider field of view, has been attempted with many systems, both for film and for video cameras. For example, fisheye lenses may be used on cameras to record a hemispherical field of view in a single exposure. However, to gain greater overall resolution and more control over separate sections of the image, multiple exposures can also be used to create a composite wide-angle image.

Many systems of composite photography have been attempted. An optimum system would be one based upon a simple standard picture shape, with equal edges, and a simple and consistent organization that lends itself to a variety of formats and applications. These qualities are characteristic of the system described in U.S. Pat. No. 5,023,725 to McCutchen for a "Method and Apparatus for Dodecahedral Imaging System," where an imaging system is described based on the geometry of the pentagonal dodecahedron. There, a viewfinder apparatus is described whereby a movable region of interest is filled by combining information from one or more pentagonal video images held in a memory device. U.S. Pat. No. 5,703,604, also to McCutchen, for an "Immersive Dodecahedral Video Viewing System" further defines this process, and shows how it can be used for viewing of recorded multichannel panoramic video images.

The extraction of a movable window from a single hemispherical fisheye source image is found in U.S. Pat. Nos. 5,185,667 and 5,313,306 to Kuban et al. for an "Omniview Motionless Camera Endoscopy System."

In U.S. Pat. No. 5,130,794 to Ritchey for a "Panoramic Display System," a single video image of a near-spherical field of view is subdivided and sent to a multiplicity of flat display panels in a cubical room for viewing, in addition to being viewed by means of sending a portion of the image to a head-mounted display, through means not described. The geometry used to subdivide the image is according to a cube.

Other new forms of video processing have attempted to create a means of providing a panoramic source image from which a moving window of interest can be extracted. Apple Computer's Quicktime™ VR system is a set of programming tools for splicing together from 8 to 30 photographed views into an apparently continuous scene up to 55° above and below the horizon. From this source image, a movable window of interest can be extracted, with the somewhat squashed appearance of the source image corrected for in the extracting process so that the extracted image looks natural. The images used in the extraction process are assumed to have been mapped around a cylindrical projection of a globe, which introduces distortion and changes of resolution, especially at the poles.

Another example of providing a panoramic view is U.S. Pat. No. 5,187,571 to Braun et al. for a "Television System for Displaying Multiple Views of a Distant Location," which describes a television transmission system using composite cameras to cover a wide field of view, and a composing station to select a widow of interest from among these available views, and to display the window of interest on a monitor.

U.S. Pat. No. 5,200,818 to Neta et al. for a "Video Imaging System with Interactive Windowing Capability" describes a generalized compound imaging system simultaneously displaying an overall image of the entire panoramic scene as well as a roving window of interest.

U.S. Pat. No. 5,153,716 to Smith for a "Panoramic Interactive System" describes a film viewing system wherein a portion of a recorded film panoramic image is displayed by a mechanical rotary apparatus controlled by the user. Besides being restricted to film images only, this invention also has limited provision for displaying images in motion.

What is needed is a full spherical view, i.e. an immersive view, albeit with some distortion, but an immersive view that does not rely on using a window to select what part of the full spherical view will be presented.

SUMMARY OF THE INVENTION

Accordingly, it is an object of the present invention to show on the inner surface of a hollow object or the outer surface of an object a full spherical view, i.e. all four-pi radians of a view, here called an immersive view, that would be seen from some fixed position by looking in all different directions. In the case of providing the view on the outer surface of the object, the view is, in a sense, inside out; what is shown in such a mounted immersive view bends away from a viewer, instead of surrounding a viewer.

The above object is achieved in the present invention by providing a process for constructing an image of substantially all four-pi radians of a view, the view having a zenith direction around which an azimuth is measured starting at a view-prime-meridian, and from which a polar angle is measured, the process comprising the steps of: fixing a camera at a location appropriate for photographing the view; determining a set of directions in which to aim the camera so as to capture substantially all four-pi radians of the view, each direction in the set of directions indicated by an azimuth and a polar angle, each direction having a field of view, the set of directions based on the field of view in each direction and a requirement that a photograph taken in any one of the directions have a partial overlap with photographs taken in at least four other of the directions, the set of directions including the zenith and the nadir; taking a photograph in each of the directions in the set of directions; arranging in a two-dimensional layout portions of the photographs so as to provide without repetition substantially all four-pi radians of the view, the portions of the photographs so arranged constituting a view projection; bending the view projection so as to create a surface that conforms to a surface of a closed-surface object.

The terminology closed-surface object is intended to comprise objects such as a sphere as well as objects that depart significantly from true sphericity, and in fact may not be thought of as spherical at all; the terminology is intended to comprise any object having surfaces that close on themselves. Thus, e.g. an object created by significantly deforming a sphere, and doing so differently in different places, would be included, but not a cylinder having open ends. Even a cube is intended to be comprehended by the terminology closed-surface object as used here. What is of essence in the present invention is that the immersive view, i.e. the image of the view from the position of the camera, is substantially complete, i.e. includes substantially all four-pi radians of view, and is provided as a closed surface.

In another aspect of the present invention, an image of substantially all four-pi radians of a view, from a predetermined location, is provided according to the above-described method.

In yet another aspect of the present invention, an image of substantially all four-pi radians of a view, from a predetermined location, provided as portions of photographs arranged on the outer surface of a closed-surface object.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention comprises both a process for constructing an inmmersive view, i.e. a full spherical view (all four-pi radians of view), as well as an immersive view so constructed. In the preferred embodiment, the immersive view according to the present invention is provided by printed portions of photographs arranged over, and affixed to the outer surface of a spherical object. In some application of the present invention, the immersive view is mounted on a structure having non-spherical geometry. For example, an immersive view of a room is advantageously conveyed as a Cartesian geometry (i.e. flat vs. curved), e.g. on the outer surface of a cube or parallelepiped. In some other applications of the present invention, the immersive view is provided on the inner surface of a hollow object having a closed surface. For example, an immersive view according to the present invention could be provided on the walls, ceiling, floor, doors and windows of a room; in some aspects of this application of the present invention, some holes may be provided in the immersive view, such as a hole for a window or for a door. The present invention is intended to comprehend providing an immersive view as substantially the entire inner surface of a hollow object or substantially the entire outer surface of an object, the object in either case having a closed-surface. Thus, the present invention is intended to comprehend using as a mount any object, which may even be formed from the photographs themselves, that can be created by deforming a sphere without cutting a hole in the surface of the sphere.

Figure 1:
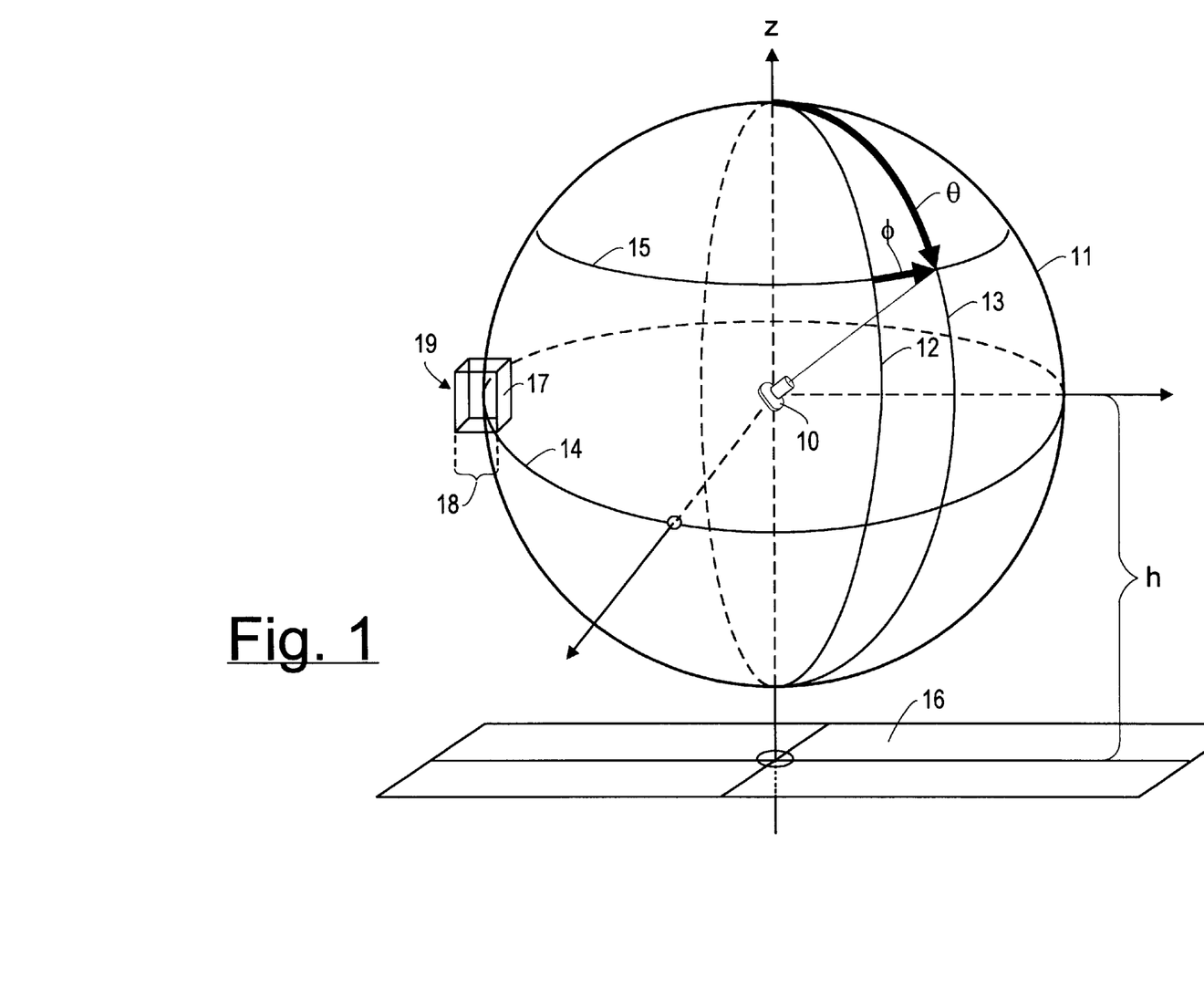
FIG. 1 shows a camera at a fixed location aimed in a particular direction to photograph a view in the direction, according to the present invention.

Referring now to FIG. 1, an immersive view according to the present invention is constructed by first providing a camera 10 that allows setting and holding a shutter speed and f-stop. Further, although it is not essential, the camera should have a normal lens for the diaphram being used, i.e. not a telephoto or wide angle lens. By setting and holding the shutter speed and f-stop through all of the photographs to be taken in constructing the immersive view, each photograph will have essentially the same volume of focus 19, a volume of space defined by a depth of view 18 and a field of view 17, in the direction aimed at by the camera, in which the camera is substantially focused. The term field of view is used here to indicate the height and width of what is viewable at the point of focus of a camera, a point some distance from the camera at which objects are in focus. The volume of focus includes the point of focus, and includes distances closer to the camera and distances further from the camera, all within the (lateral) field of view.

In the best mode today, the camera should use film from which negatives can be developed. This preference is based on the greater resolution provided today by such film, compared to video film or to photographs taken using digital cameras.

The camera 10 is fixed at some location appropriate for taking the photographs needed for constructing the immersive view, the location at some pre-determined height h above the ground or equivalent surface 16, measured in the vertical, z-direction.

In the course of taking the photographs needed to build up the immersive view, the camera will be aimed in different directions so that, considering the volume of focus of the camera (by virtue of the fixed shutter speed and f-stop), the full spherical view will be photographed. Each such direction is specified by a polar angle $\theta$, measured from the vertical direction, and an azimuthal angle $\phi$, measured from a view-prime meridian 12.

The view from the location of the camera 10 has a view equator 14, at which the polar angle has a value of pi/2. This view equator is a line of latitude on an imaginary spherical surface 11, the view sphere, just beyond the camera 10. The view sphere 11 has other lines of latitude 15; and it also has various lines of longitude 13, one of which is the view-prime-meridian 12. The polar angle for a particular aim of the camera is the angle measured from the axis representing the vertical, z-direction, to the line of latitude intersected by the aim of the camera. The azimuthal angle for a particular aim of the camera is the angle measured from the view-prime-meridian to the line of longitude intersected by the aim of the camera.

Next, the camera is set at the location from which the photographs will be taken, and a light reading is made. Then the shutter speed and f-stop are set based on the light reading, fixing the depth of field, and so fixing the volume of focus, assuming no changes have been made to alter the field of view. In the best mode, the shutter speed and f-stop are set once and held fixed for all the photographs. It is, however, not necessary to hold the shutter speed and f-stop fixed. In some situations, such as for example where a view encompasses objects at dramatically different levels of brightness, one volume of focus would provide perhaps an inadequate set of photographs. Then the depth of field, and hence the volume of focus, can be advantageously adjusted, from time to time, by taking photographs in the directions with different levels of brightness using different exposure times.

Next, how to aim the camera is determined. What is needed is a set of directions, based on the field of view of the camera, in which to aim the camera so as to capture substantially all four-pi radians of the view. The set of directions must be such that a photograph taken in any one of the directions has a partial overlap with photographs taken in at least four other of the directions, two adjacent in an azimuthal (latitudinal) sense, and two adjacent in a polar angle (longitudinal) sense. In the best mode, the set of directions includes a vertical direction and a downward direction, and 13 azimuthal orientations in each of 9 polar angles, for a total of 13×9+2=119 directions; such a set of directions is based on an appropriate, corresponding field of view.

Figure 3:
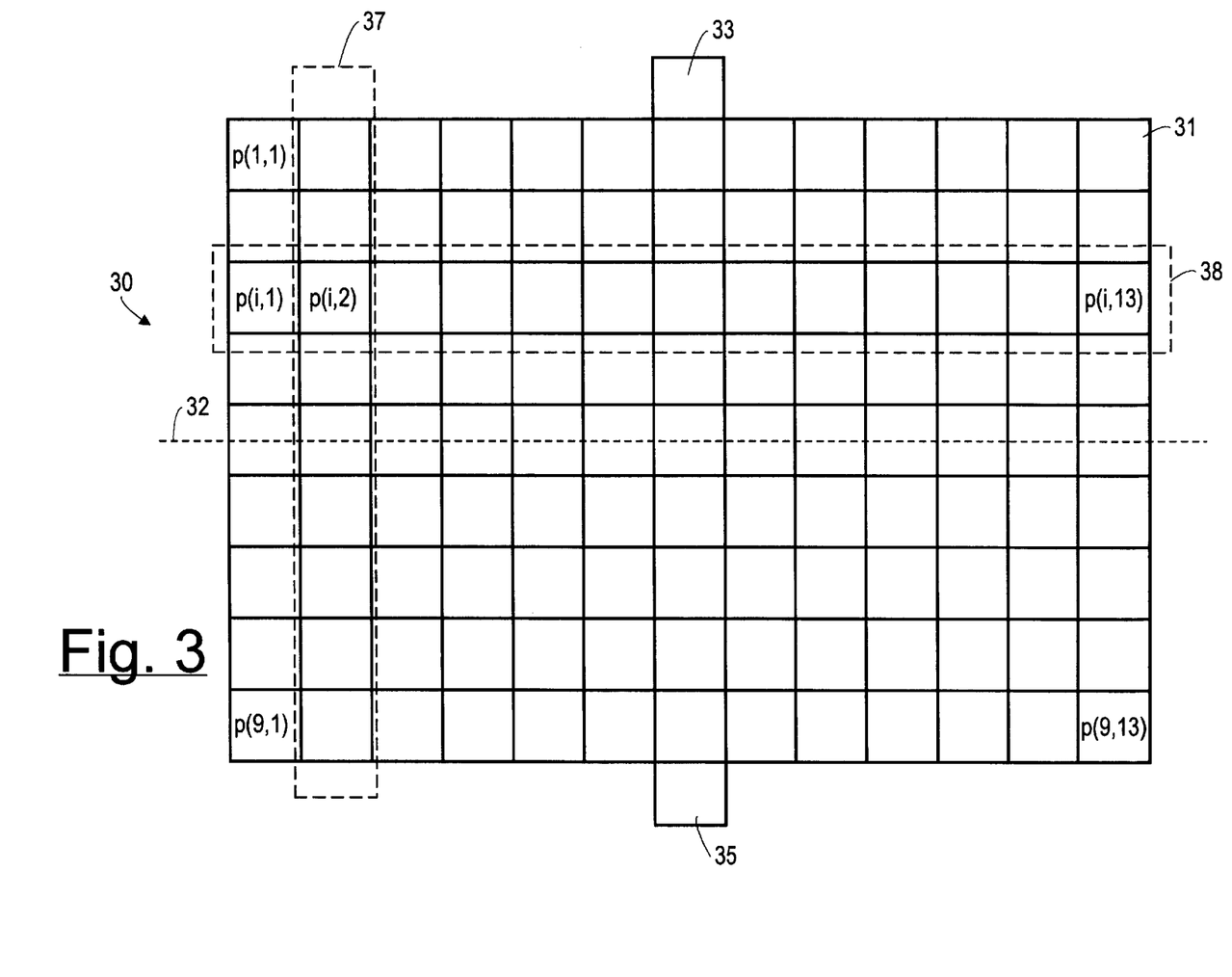
FIG. 3 shows a set of photographs arranged in an array for masking, according to the present invention.

Referring for the moment to FIG. 3, laying out the photographs taken in all of these directions would produce an array of photographs making up columns 37 and rows 38, along with the photograph 33 taken in the vertical direction and the photograph 35 taken in the downward direction. (The photographs of FIG. 3 are arranged according to the description to follow.) In the best mode, the set of directions consists of the vertical direction, the downward direction, and a pre-determined number of latitudinal bands of directions, each latitudinal band of directions consisting of a subset of directions, all at a pre-determined polar angle and differing only in azimuth. Corresponding to each latitudinal band of directions in which the camera is aimed will be a row 38 of photographs, such as for example the $i^{th}$ row consisting of the photographs labeled p(i,1), p(i,2), ..., p(i,13).

The camera is then aimed in each of the directions in the set of directions, and a photograph is made. In the best mode, the camera is aimed by a robot (not shown), programmed to aim first in the vertical direction, and then in each of the other directions in the set of directions, covering all of the directions intermediate between the directly vertically upward direction and the directly vertically downward direction by spanning in turn each latitudinal band. Using a robot-controlled camera ensures that the set of photographs taken will have the required azimuthal overlap, and will continuously span the view in a polar sense.

In the best mode, the robot aiming the camera supports the camera from directly below, and therefore would obscure (only) the photograph with the camera aimed directly vertically downward, the last photograph in the best mode. Before taking this last photograph, however, any supporting structure of the robot is repositioned outside the volume of focus of the camera when the camera is aimed directly vertically downward. Thus, the present invention provides an image of a full, unobstructed, spherical view from the position of the camera.

Next, the photographs are developed into negatives, which are then scanned into a computer. Each negative provides what is called a picture file stored on the computer. Each of these picture files is then printed. Whether the picture files are printed in color or black and white is immaterial to the present invention, and indeed the present invention is intended to encompass both color and black and white mounted immersive views. However, if a mounted immersive view is to be in color, in the best mode, a color printer is used to print the picture file for each negative.

It is also evident that it is not necessary to scan negatives into a computer and work with the resulting picture files. Instead, in all that follows, photographs printed directly from the negatives can be used to build the immersive view, without using a computer.

Figure 2:
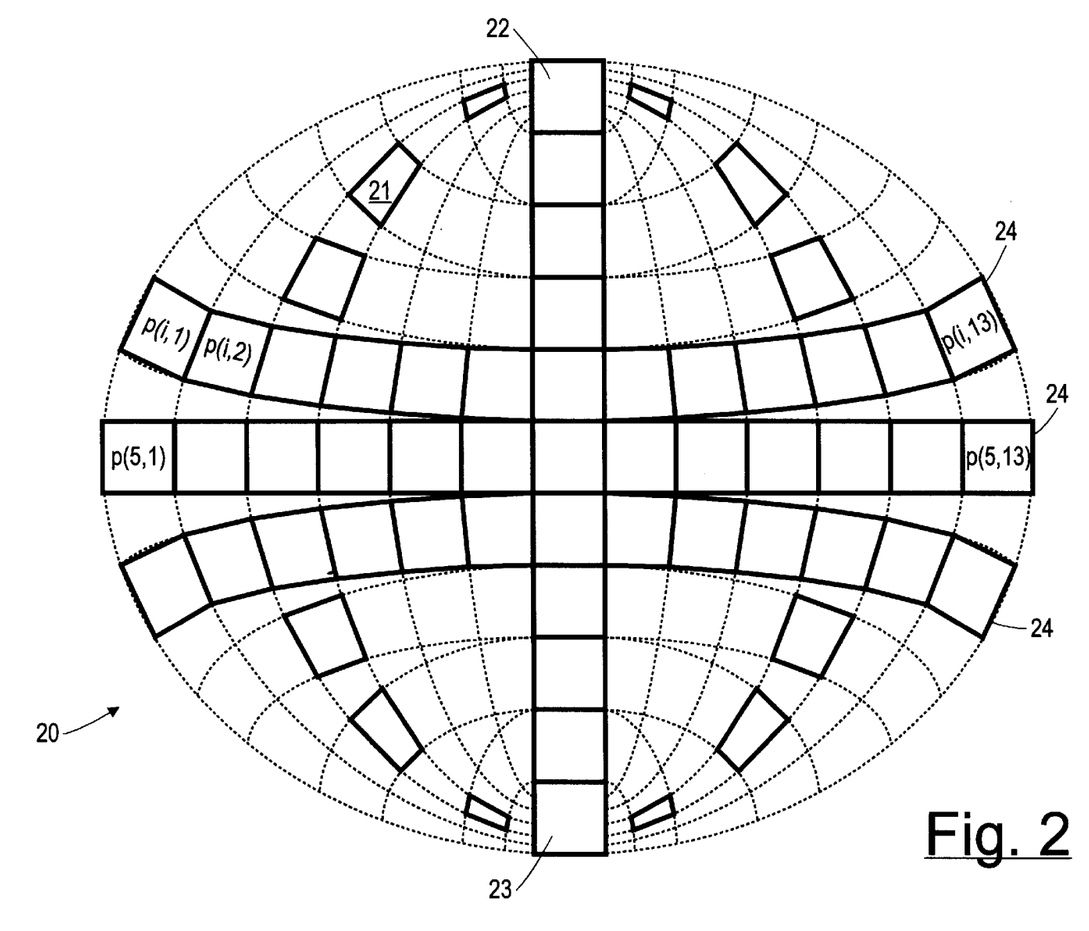
FIG. 2 shows an optional, intermediate construction of the present invention, called a spider layout.

Each negative must be identified as providing a particular element of the immersive view. Referring now to FIG. 2, to do this it is convenient to print each picture file and arrange the picture files in what is called here a spider layout 20. Each printed picture file 21 is laid down to build up a layout that corresponds to the latitudinal bands of direction in which the camera was aimed. In laying down the picture files to build up a spider layout, the overlap between adjacent picture files within a band is covered up; each picture file 21 except the first picture file 22, corresponding to the photograph taken with the camera aimed directly vertically upward, and likewise last picture file 23, partially obscures a picture file adjacent to it in the spider layout 20.

In the preferred embodiment, a spider layout is constructed only to provide a mapping showing where each picture file is to be positioned relative to the others in the immersive view. (Even in merely providing such a mapping, constructing a spider layout also ensures that the picture files do in fact convey a full, spherical view, when combined.) Although a spider layout is particularly useful in providing such a mapping, it is important to understand that the present invention is intended to encompass any means by which the picture files are correctly arranged relative to each other, including simply inspecting the picture files in the computer.

It is also important to understand that according to the present invention a mounted immersive view can be provided directly from a spider layout, rather than proceeding from a spider layout to a masked array for masking, as described below. For this, a spider layout is constructed out of actual photographs, or printed picture files. Then the first picture file (or photograph) 22 and last picture file (or photograph) 23 are bent over, and legs 24 of the "spider," each leg made up of a set of picture files or photographs p(i,1), p(i,2), ..., p(i,13) each having a same first index of its label, are bent to join together at the extremities, thus reshaping the two-dimensional spider layout into a three-dimensional object, such as a sphere, having a closed surface. Depending on which way the first and last picture files are bent over, the spider layout becomes either a view to be seen from inside the resulting object, or an inside-out view, to be seen from outside the resulting object. In the preferred embodiment, however, as already indicated, a spider layout is used only to organize the picture files, i.e. to locate them in the array 30 (see FIG. 3).

Referring now to FIG. 3, whether a spider layout is constructed, or the picture files are determined to fit together by some other means, each picture file 31 must be assigned a position in the array 30 of picture files, i.e. each must have coordinates (i,j) assigned to it, or must be identified as the first picture file 33 or last picture file 35. This assignment of coordinates, or identification as the first or last picture file, is said here to define a mapping of the picture files to the array for masking 30. The picture files of this array for masking 30 lie partially on top of each other (some lie partially on top of others) not latitudinally (i.e. moving from column to column), as in a spider layout, but longitudinally (i.e. moving from row to row). Thus, a given picture file is laid over the picture file adjacent it in the row above it or in the row below it, or both, but is not laid over the picture files in either adjacent column, so that the final arrayed picture files provide a continuous, non-repeating view when examined from top to bottom (i.e. moving from row to row), but include regions where views are repeated when examined from left to right (i.e. moving from column to column).

From the mapping so determined, the picture files are arranged in the computer, to create within the computer the array for masking 30. In this array for masking layout, the picture files are laid down to cover any row-to-row overlap so that there is a continuous, non-repeating image provided by the array when viewed from the top band down to the bottom band, but with practically all column-to-column (longitudinal) overlap still showing, i.e. not covered up. In taking the photographs to provide a full, spherical view, it is necessary to have a slightly overlapping field of view when shooting the pictures showing the view equator 14 and that will end up as picture files on the array equator 32 of the array for masking 30. (Otherwise it is likely there would be some gaps in the combined field of view.) But the mask 40 to be used (see FIG. 4), as described below, assumes no repetition of the view right at the array equator 32 (showing the view equator 14). Thus, the slight overlapping field of view used in taking the photographs on the equator must be taken into account when arranging the picture files in the array for masking. However much the picture files are laid over each other in the row containing the equator 32, that is how much the picture files are laid over each other in all the other rows, even though such a small overlaying of the picture files will still leave most overlap visible (still showing).

Figure 4:
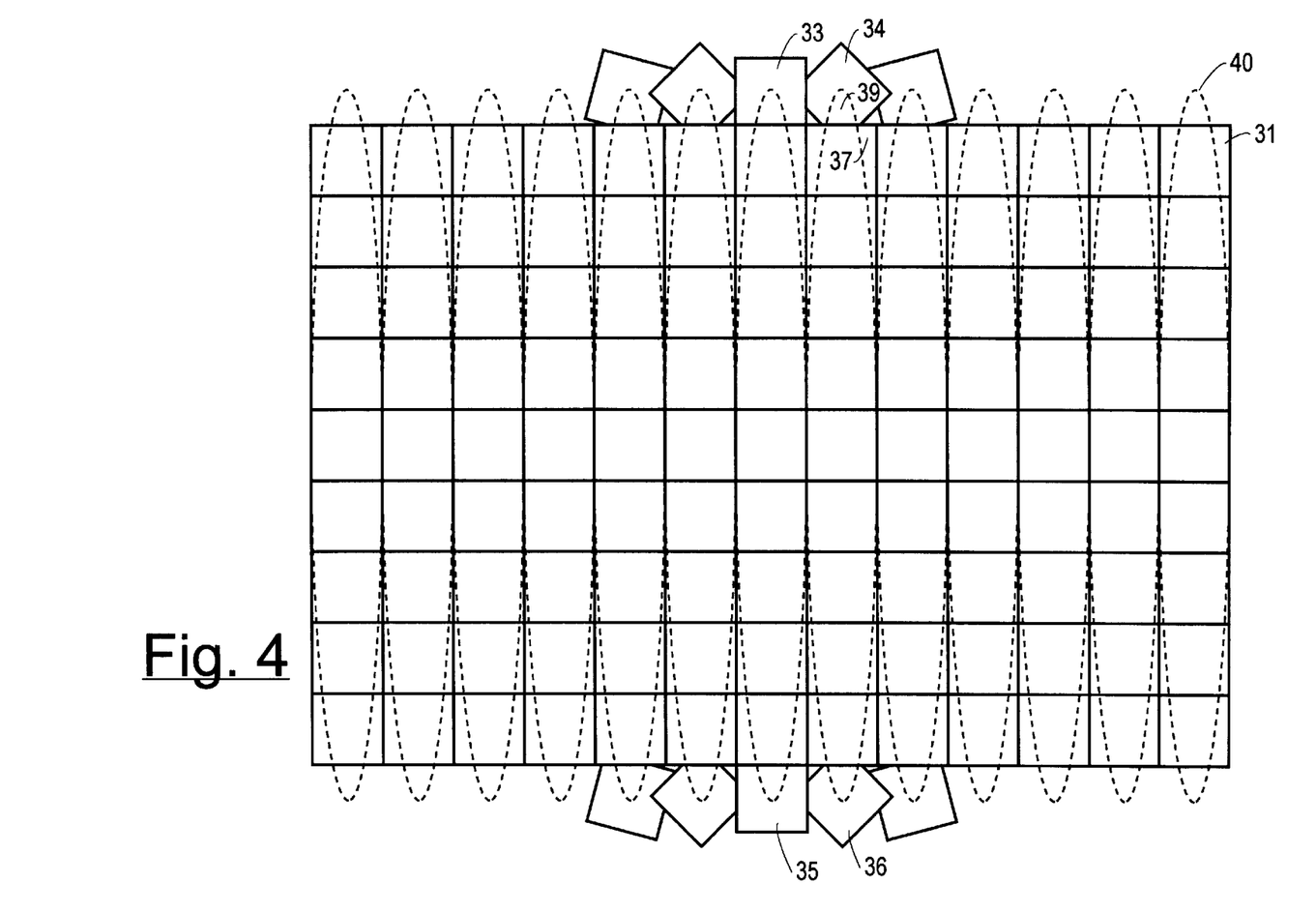
FIG. 4 shows the array for masking overlaid with a mask selecting final regions, according to the present invention.

Referring now to FIG. 4, the first picture file 33 is reproduced as a copy 34, and the copy 34 is positioned alongside the first picture file 33 and rotated so as to align the image conveyed by the copy 34 with the image conveyed by a first-row picture file 37, the picture file adjacent the one immediately below the first picture file. The copy 34 is rotated and placed beneath the first row picture file 37 so that any overlap with the first-row picture file is covered by the first-row picture file, at least in the region 39 that will be selected by the masking described next. This copying, re-positioning and orienting is repeated so that there is a copy of the first picture file positioned and oriented properly to match up with each first-row picture file. The same copying, repositioning and re-orienting is also done for the last picture file 35, so that a copy 36 of the last picture file is provided, suitably positioned and oriented, for every picture file of the last row.

The computer is next used to mask the array for masking, with a mask 40 appropriate for selecting enough of portions of the picture files 31, and 33–36 to substantially show the four-pi view, but without showing any overlap. The mask consists of final forms 51 that select final regions of the arrayed picture files. These final regions, in combination, provide the projected four-pi view, i.e. a view projection onto two dimensions. Within the computer, the mask and the array for masking can be deformed. In the preferred embodiment, each final form 51 of the mask is a planar projection of a segment of surface of a sphere included between two azimuths.

It is usually necessary to deform, within the computer, the mask or the array for masking, or both, so that the mask and the array for masking span substantially the same width and substantially the same height, but the mask is made not to extend past halfway up the first picture file, or past halfway down the last picture file, because it is the middle of these picture files that is the zenith and nadir, respectively. The proper extent of the deformed mask 40 is shown in FIG. 4 as not extending past halfway up the first picture file 33. With the mask then fitted to the array for masking, and laid over the array for masking in the computer, the portions of the array for masking not selected by the mask are eliminated, leaving behind a set of final forms, constituting a view projection, canoe-like in shape for a mounted immersive view in the form of a spherical object (but deformed from a canoe-like shape for a mounted immersive view in other forms).

Figure 5:
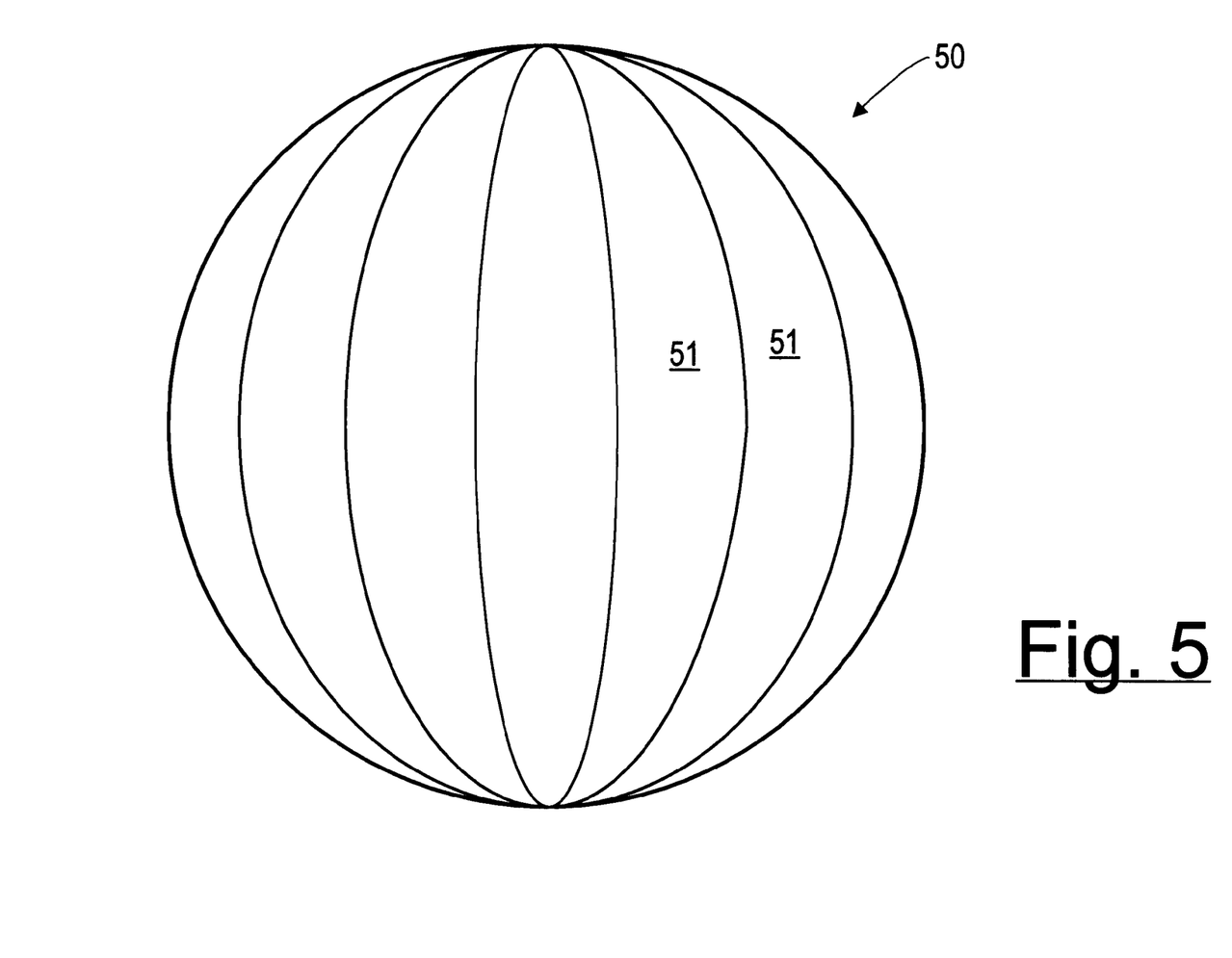
FIG. 5 shows the final regions of FIG. 4 adhered to or forming the outer surface of a spherical object, according to the present invention.

Lastly, referring now to FIG. 5, each final form 51, i.e. the entire view projection, is printed and affixed to the outer surface of a spherical object 50, which then bears an image on its outer surface of substantially all four-pi radians of the view from the position of the camera. In another aspect of the present invention, instead of affixing the final forms 51 to a spherical object, the final forms 51 are used to build up a spherical object. In such an embodiment, the final forms 51 are printed onto a material, such as paper or transparent film or card stock, having stiffness and flexibility appropriate for constructing the spherical object. In other words, the view projection (the combination of final forms) is bent so as to conform it to a surface of a closed surface object. (A view projection can always be regarded as a set of connected regions, even though some regions might be connected to others at only a single point. Thus, one can always imagine bending a single oddly shaped two dimensional object, even though one might in fact have cut the object into various physically separated regions.)

In providing a mounted immersive view directly from a spider layout 20 (see FIG. 2), the spider layout itself is the view projection. Whether the masked array for masking is constructed (with or without ever constructing a spider layout), or instead a spider layout is used directly, a (two-dimensional) view projection is provided and then bent in three dimensions to provide the mounted immersive view.

Figure 6:
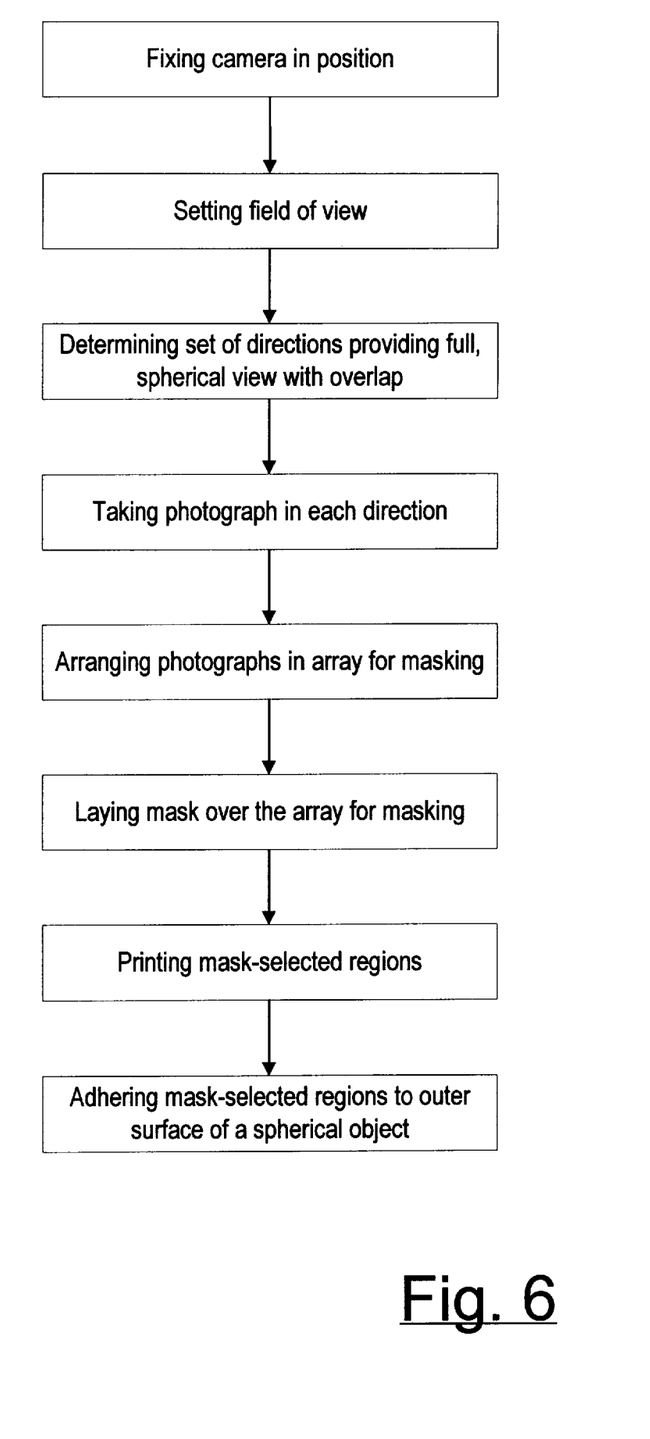
FIG. 6 indicates as a process flow chart the process of constructing an immersive view, according to the present invention.

Referring now to FIG. 6, the process of constructing a mounted immersive view according to the preferred embodiment of the present invention is indicated as a series of high-level steps in a process flow chart.

In the above description of the preferred embodiment in which an immersive view is provided on the outer surface of a spherical object, terms that seem specially appropriate for a spherical object are used, such as lines of longitude and lines of latitude. Although such terms may not at first seem to be useful for some other closed-surface objects, such as a cube, they can nevertheless be given a precise meaning no matter what the form of the closed surface object, since any such object can be got from deforming a spherical object. for example, if the mounted immersive view is provided on the (inner or outer) surface of a cube, one need only define where on the cube corresponds to the view from the camera of the zenith, and where on the cube corresponds to the view from the camera of the nadir. Although a natural choice would be the centers of opposing faces, such a choice is not actually necessary; depending on the immersive view to be provided, the two points on the cube that correspond to the zenith and nadir might advantageously be chosen so as to be closer together.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A process for constructing an image of substantially all four-pi radians of a view, the view having a zenith direction around which an azimuth is measured starting at a view-prime-meridian, and from which a polar angle is measured, the process comprising the steps of:

i) fixing a camera at a location appropriate for photographing the view;

ii) determining a set of directions in which to aim the camera so as to capture substantially all four-pi radians of the view, each direction in the set of directions indicated by an azimuth and a polar angle, each direction having a field of view, the set of directions based on the field of view in each direction and a requirement that a photograph taken in any one of the directions have a partial overlap with photographs taken in at least four other of the directions, the set of directions including the zenith and the nadir;

iii) taking a photograph in each of the directions in the set of directions;

iv) providing a view projection by arranging in a two-dimensional layout portions of the photographs so as to provide without repetition substantially all four-pi radians of the view, the portions of the photographs so arranged constituting the view projection; and v) bending the view projection so as to create a surface that conforms to a surface of a closed-surface object; wherein the step of providing a view projection comprises the steps of:

a) arranging the photographs, except for the photographs in the zenith and nadir directions, in an array for masking, the array for masking having rows and columns of photographs including a first row and a last row, the first row having photographs taken in the nearly zenith direction and the last row having photographs taken in the nearly nadir direction, the array for masking showing all overlap in photographs in adjacent columns but overlaid to conceal all overlap between photographs in adjacent rows;

b) augmenting the array for masking by duplicating the photograph in the zenith direction and re-positioning and re-orienting it so as to have a duplicate of the photograph in the zenith direction adjacent each photograph in the first row and oriented so as to continue in a polar sense the image conveyed by the photograph in the first row, and doing likewise for the photograph in the vertical direction and each photograph in the last row;

c) masking the array for masking with a mask appropriate for selecting enough of portions of the photographs to substantially show the four-pi view without showing overlap, the mask having final regions that in combination provide the four-pi view without overlap, and deforming the mask, or the array for masking, or both so that the mask and array for masking correspond substantially in both height and width; and d) eliminating the portions of the array for masking not within the final regions, leaving behind the view projection.

2. A process for constructing an image of substantially all four-pi radians of a view, the view having a zenith direction around which an azimuth is measured starting at a view-prime-meridian, and from which a polar angle is measured, the process comprising the steps of:

i) fixing a camera at a location appropriate for photographing the view;

ii) determining a set of directions in which to aim the camera so as to capture substantially all four-pi radians of the view, each direction in the set of directions indicated by an azimuth and a polar angle, each direction having a field of view, the set of directions based on the field of view in each direction and a requirement that a photograph taken in any one of the directions have a partial overlap with photographs taken in at least four other of the directions, the set of directions including the zenith and the nadir;

iii) taking a photograph in each of the directions in the set of directions;

iv) providing a view projection by arranging in a two-dimensional layout portions of the photographs so as to provide without repetition substantially all four-pi radians of the view, the portions of the photographs so arranged constituting the view projection; and v) bending the view projection so as to create a surface that conforms to a surface of a closed-surface object; wherein the step of providing a view projection comprises the step of arranging the photographs into a spider layout, the spider layout consisting of the photographs arranged in a planar layout as if the photographs had been assembled onto the surface of the object to correspond to the four-pi view from the position of the camera, so that if two photographs overlap, then the overlap in one of the two is placed beneath the overlap of the other, and then as if the three-dimensional surface had been cut along one line of longitude of the surface, and also along lines of latitude corresponding to the different polar angles of each band, and the two edges of each resulting cut band had been pulled apart and the cut band laid flat, including the first and last photograph, and each cut and laid flat band had been positioned adjacent the band it lay adjacent to before being cut and laid flat.

3. A process for constructing an image of substantially all four-pi radians of a view, the view having a zenith direction around which an azimuth is measured starting at a view-prime-meridian, and from which a polar angle is measured, the process comprising the steps of:

a) providing a camera that allows setting a consistent shutter speed and f-stop;

b) providing film useable by the camera, from which negatives can be developed;

c) fixing the camera at some location appropriate for photographing the view;

d) taking a light reading, and setting the shutter speed and f-stop based on the light reading;

e) determining a set of directions in which to aim the camera so as to capture substantially all four-pi radians of the view, each direction in the set of directions indicated by an azimuth and a polar angle, the set of directions based on the field of view and a requirement that a photograph taken in any one of the directions have a partial overlap with photographs taken in at least four other of the directions, the set of directions including the zenith direction and the opposite, nadir direction;

f) aiming the camera in the zenith direction and taking a first photograph;

g) aiming the camera and photographing in each of the other directions in the set of directions, except for the nadir direction;

h) aiming the camera in the nadir direction, removing from the field of view any structure supporting the camera, and taking a last photograph;

i) developing the photographs into negatives;

j) creating from each negative a picture file;

k) determining a mapping of the picture files onto a plane so as to position, adjacent each other, picture files showing views in adjacent directions;

l) arranging the picture files according to the mapping, for providing a preliminary array for masking, the preliminary array for masking such that all row-to-row overlap is uncovered except for a constant amount needed to blend picture files showing the view corresponding to the polar angle having a value of approximately 90 degrees, the preliminary array for masking including a first picture file corresponding to the first photograph, and a last picture file corresponding to the last photograph;

m) augmenting the preliminary array for masking by duplicating the first picture file and re-positioning and re-orienting the duplicated first picture file so as to have a duplicate of the first picture file adjacent each picture file in the first row and oriented so as to continue in a polar sense the image conveyed by the picture file in the first row, and doing likewise for the last picture file and each picture file in the last row, for providing an array for masking;

n) masking the array for masking with a mask appropriate for selecting enough of portions of the picture files to substantially show the four-pi view without showing overlap, the mask having final regions that in combination provide the four-pi view without overlap, and deforming the mask, or the array for masking, or both so that the mask and array for masking correspond substantially in both height and width;

o) eliminating the portions of the array for masking not within the final regions, leaving behind a set of final forms constituting a view projection; and p) bending the view projection so as to conform it to a surface of a closed-surface object.

4. The process as claimed in claim 3, wherein the set of directions consists of the zenith direction, the nadir direction, and a pre-determined number of bands of directions, each band of directions consisting of a subset of directions, all directions of a band at a pre-determined polar angle and differing only in azimuth.

5. The process as claimed in claim 4, wherein each final region of the mask is a planar projection of a segment of surface of a sphere included between two azimuths.

6. The process as claimed in claim 4, wherein the step of determining a mapping comprises the steps of:

a) arranging the picture files into a spider layout, the spider layout consisting of the picture files arranged on a plane as if the picture files had been assembled onto the surface of the outside of a sphere to correspond, inside out, to the four-pi view from the position of the camera, so that if two picture files overlap, the overlap in one of the two is placed beneath the overlap of the other, and then as if the three-dimensional surface had been cut along a line of longitude of the spherical surface, and also along lines of latitude corresponding to the different polar angles of each band, and the two edges of each resulting cut band had been pulled apart and the cut band laid flat, including the first and last photograph, and each cut and laid flat band had been positioned adjacent the band it lay adjacent to before being cut and laid flat; and b) creating from the spider layout the mapping showing how the picture files of the spider layout are to be laid down on a plane so that all row-to-row overlap is uncovered except for a constant amount needed to blend picture files showing the view corresponding to the polar angle having a value of approximately 90 degrees, and each band is immediately adjacent two other bands, unless the band is the first band in which case the band is immediately adjacent only the second band and each picture file of the first band abuts a first picture file, the first picture file oriented according to the overlap, and similarly for the last band and last picture file.

7. The process as claimed in claim 6, wherein each final region of the mask is a planar projection of a segment of surface of a sphere included between two azimuths.

8. An image of substantially all four-pi radians of a view, from a predetermined location, provided according to the method of claim 3.

* * * * *